United States Patent
Slagle

[15] 3,700,164
[45] Oct. 24, 1972

[54] ODOMETER

[72] Inventor: Rufus L. Slagle, P.O. Box 1327, Panhandle, Tex. 79068

[22] Filed: Jan. 19, 1972

[21] Appl. No.: 219,104

[52] U.S. Cl. .............................. 235/95 R, 33/141 E
[51] Int. Cl. ............................................. G01c 22/00
[58] Field of Search ....... 235/95 R, 96, 91 R, 103, 92 DN; 33/141 R, 141 E, 142; 324/171

[56] References Cited

UNITED STATES PATENTS

| | | | |
|---|---|---|---|
| 2,091,025 | 8/1937 | Breer et al. | 235/95 R |
| 2,327,657 | 8/1942 | Middleton | 33/142 |
| 2,557,450 | 6/1951 | Mentzel | 235/92 DN |
| 3,151,235 | 9/1964 | Greenshields | 235/92 DN |
| 3,166,245 | 1/1965 | Maschke | 235/95 R |
| 3,226,021 | 12/1965 | Dusinberre et al. | 235/96 |
| 3,233,827 | 2/1966 | Byles | 235/95 R |
| 3,317,131 | 5/1967 | Walsh | 235/91 R X |

Primary Examiner—Richard B. Wilkinson
Assistant Examiner—Stanley A. Wal
Attorney—Jerry J. Dunlap et al.

[57] ABSTRACT

An odometer which includes a hollow drum having a tubular arm extending normal to one side thereof; a contact-supporting plate having a hollow shaft projecting normal therefrom through the tubular arm; a mounting arm having one end secured to one end of the shaft which is secured at its other end to the contact-supporting plate; a mounting bracket pivotally secured to the other end of the mounting arm; electrical contact points mounted on the contact-supporting plate and adapted for movement between alternate positions for opening and closing an electrical circuit; and eccentric means secured to the drum and rotatable therewith in relation to said contact-supporting plate for periodically actuating said contact points during the revolution of the drum. An electrical lead extends from the contact points through the shaft attached to the contact-supporting plate and forms a portion of an electrical circuit which includes a switch and a distance indicating meter. Actuating means is connected to the mounting arm for pivoting this arm in the mounting bracket to move the drum between an operative position in contact with a rotating member, and a non-operative position out of contact therewith.

13 Claims, 6 Drawing Figures

PATENTED OCT 24 1972

ODOMETER

BACKGROUND OF THE INVENTION

1. Field of the Invention

This invention relates to odometers, and particularly to a precision odometer which can be used for accurately measuring distances on the ground, using a ground traversing vehicle in conjunction with the odometer.

2. Brief Description of the Prior Art

A number of types of devices have previously been proposed and manufactured for measuring and recording or indicating distances traversed while walking, or while riding in various types of vehicles. In odometers of the type which have been used for measuring the distance traversed by automobiles and other self-propelled vehicles, it is often the practice to utilize a rotating mechanism, or a structure such as a rotating shaft, gear or wheel on the vehicle to provide the point of origin of a signal force or pulse which, through such rotating member, is correlated in its magnitude or frequency with the number of rotations of a ground engaging member, such as a wheel of the vehicle. In some instances, such as in the case of the structures described in U.S. Pat. No. 1,358,082 to Koehler and U.S. Pat. No. 2,091,025 to Breer et al., an electrical circuit is provided having movable contacts which are periodically moved by an eccentric member driven in rotation through the mechanism provided so as to open and close the circuit in correspondence to the number of revolutions of the rotating member.

In some instances, the rotating member from which the signal originates is the axle connected to the wheel and in others, it is a gear through which the wheel is driven. In such cases, the development of wear surfaces on the axle, or play in the kinematic train connecting the gears to the actual driven, ground engaging wheel not infrequently results in some inaccuracy in the measurement of the distance traversed by the vehicle as a result of the rotation of the ground engaging wheels in contact with the ground. Where the odometer signals originate at a drive shaft, gear or other mechanism in the kinematic train other than the tire itself, these variations in distance traveled with variations in pneumatic pressure, are not accurately taken into account in the measurement derived from the odometer. Moreover, where pneumatic tires are involved, the actual radius of the tire at various times may vary with variations in the pneumatic pressure, and this in turn results in a different distance being traversed by the vehicle according to the variation in pneumatic pressure involved.

In other systems which have been proposed and which employ electrical signal conveying means between the rotating member used to provide the signal source, and the counter which records and indicates the distance traveled, severe vibrations of the vehicle resulting from the traversal of rough and uneven terrain can cause sufficient malfunction of sensitive contact points and other portions of the circuitry to give a spurious readout at the meter used to record the distance traveled.

In some instances, it has previously been proposed to provide odometer devices in which a rotating drum or cylindrical member is placed in direct frictional engagement with the ground engaging wheel and, more specifically, with the tire or other peripheral member carried thereon. Thus, in Tillman U.S. Pat. No. 3,458,128, a mechanically actuated odometer is provided for use on a golf cart and includes a cylindrical pulley end which contacts the tire portion of the golf cart wheel. The pulley end may be selectively engaged or disengaged with the golf cart wheel by the pivotal movement of a supporting arm structure in conjunction with a spring which functions to maintain frictional driving contact when the pulley end is pivoted into contact with the periphery of the wheel.

A number of situations exist in which it is desirable to have a precision or highly accurate odometer instrument which can be mounted on an automobile or similar vehicle in a way which will provide a very accurate measurement and indication of a distance traversed by the automobile. The conventional odometer which is provided in association with the speedometer of the vehicle is not sufficiently precise or accurate for such uses, and in many cases is not sufficiently finely calibrated to provide a reading in feet or even accurate small fractions of miles.

One situation in which a device of the type described would be highly useful is in the procedure of aerial crop dusting. Here, an aircraft distributes a fungicidal dust or spray over a crop by making a plurality of passes over the crop and releasing dust or spray at a low altitude. The pilot will frequently know with considerable certitude, considering the wind conditions and the type of material being sprayed or dispensed, the extent of crop coverage which may be expected upon each pass. It is difficult, however, to fly the aircraft along parallel lines of flight which are as precisely located with respect to previous passes as would be desirable in order to prevent overlap of coverage, or failure to obtain complete coverage.

Efforts to achieve maximum economy while realizing complete coverage of the crop have previously taken the form of providing markers of some type which are visible to the pilot, and which are spaced at intervals across an end of the field to be covered so that the pilot may align the path of flight with such markers as the parallel passes over the field are flown. The markers are preset by some measuring technique so as to place them at measured intervals corresponding to the swath or band which can be covered by the spray or dust during each pass of the aircraft. Various methods are used to measure the appropriate intervals for setting the markers, but all of the methods previously in use either suffer from inaccuracy, or are time consuming and relatively costly. A precision odometer easily mounted on an automobile would permit both the lengthy time required to effect the measurements for crop dusting purposes to be made, and would also, as contrasted with all but the slowest of methods presently in use, improve the accuracy of locating the markers to provide guides for the flight path intervals.

BRIEF DESCRIPTION OF THE PRESENT INVENTION

This invention provides a precision odometer device for very accurately measuring a distance traversed by a vehicle moving upon ground engaging wheels and moving at relatively great speeds. Broadly described, the precision odometer of the present invention comprises a hollow drum having a circular, and preferably cylindrical outer periphery, and having a tubular arm extending normal from one side of the drum along the central axis thereof. Disposed inside the drum is a contact-supporting circular plate having a hollow shaft secured to the center thereof, and projecting normal from the plate through the tubular arm attached to the drum so that the drum and its associated arm may rotate freely upon the hollow shaft secured to the contact-supporting plate. The drum further carries eccentric means which is rotatable therewith, and which is positioned for displacing, during rotation of the drum, electrical contact points which are mounted on the contact-supporting plate. The eccentric means functions to move the contact points to open and close an electrical circuit containing these points periodically during the rotation of the drum.

An electric lead extends from the contact points through the bore in the hollow shaft which is secured to the contact-supporting circular plate for connection in an electric circuit which includes a counter for registering and indicating a distance traveled by a vehicle upon which the odometer is mounted, a source of power, such as a storage battery, and appropriate switch elements, such as an on-off switch for the odometer device and the ignition switch of an automobile.

The hollow shaft secured to the contact-supporting plate is journaled in a hub located at one end of an angulated mounting arm which has its other end pivotally connected to a mounting bracket. The mounting bracket is utilized for mounting the precision odometer on an automobile or other vehicle in proximity to a ground engaging wheel with which the odometer drum cooperates during operation of the odometer.

The mounting arm of the odometer is connected to resilient biasing means which is also connected to some point on the vehicle and functions to resiliently urge the drum against a ground engaging wheel of the vehicle when the odometer is to be utilized for measuring distance. Means is further provided to facilitate movement of the odometer drum in a direction opposing the bias of the resilient means, so that the operator of the vehicle can move the odometer to an inoperative status in which the drum is disengaged from the ground engaging wheel of the vehicle. The precision odometer as thus constructed is capable of accurately measuring distances traversed by a vehicle upon which it is mounted. Moreover, the device is mechanically rugged and does not suffer malfunction when the vehicle is driven over rough terrain. From the foregoing description of the invention, it will be perceived that it is an object of the present invention to provide a precision odometer which is mechanically reliable and is characterized in having a long and trouble free operating life.

Another object of the invention is to provide a precision odometer which may be used for precisely measuring distances in feet or rods over which a vehicle, such as an automobile, is driven, and which will achieve such precision of measurement whether the vehicle be driven at relatively slow speeds, or at relatively high speeds.

A further object of the invention is to provide a precision odometer which can be quickly and easily mounted on an automobile or other self propelled vehicle so as to provide control of the odometer at the dashboard of the vehicle within easy reach of the vehicle operator.

Additional objects and advantages will become apparent as the following detailed description of the invention is read in conjunction with the accompanying drawings which illustrate the invention.

BRIEF DESCRIPTION OF THE DRAWINGS

FIG. 6 is an electrical circuit diagram illustrating the circuitry provided as a portion of the precision odometer of the invention.

DETAILED DESCRIPTION OF A PREFERRED EMBODIMENT OF THE INVENTION

Figure 1:
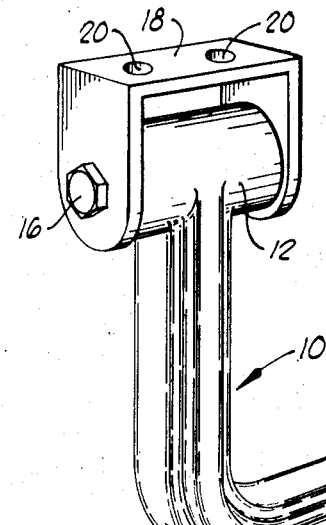
FIG. 1 is an exploded view of a major portion of the precision odometer of the invention.

Referring initially to FIG. 1 of the drawings, certain parts of the precision odometer of the invention are shown therein and include an angulated mounting arm 10 which, in the illustrated embodiment of the invention, includes a pair of right angle bends intermediate the length of the mounting arm. It will be understood that other shapes of mounting arm can be utilized, and from the discussion which follows, it will be perceived that in some types of mounting situations, mounting arms of a different configuration will be desirable. The mounting arm 10 has a hub 12 at one end thereof and a hub 14 at the other end thereof. The hub 12 has a bore therethrough for receiving a bolt 16 used for pivotally supporting the mounting arm in a mounting bracket 18. A pair of screw or bolt holes 20 are provided in the mounting bracket 18 to permit the mounting bracket to be secured to an appropriate portion of the structure of an automobile or other vehicle upon which the odometer is to be mounted.

The hub 14 at the other end of the mounting arm 10 from the hub 12 is also centrally bored to permit one end of a hollow shaft 22 to be extended into and received by this hub. The shaft 22 has a flat surface 22a formed at the end thereof which is extended into the hub 14, and a pair of set screws 24 are extended radially through the hub 14 to contact the flat surface 22a on the shaft 22 and prevent rotative movement of this shaft within the hub. On the opposite side of the hub 14 from that side which is connected to the mounting arm 10, the hub carries a protuberance 26 which is apertured for receiving the threaded shaft of an eyelet 28. A nut 29 secures the eyelet 28 in engagement with the protuberance 26.

The shaft 22 extends substantially normal to the hub 14 and carries at its end opposite the hub, a contact-supporting circular plate 30. The contact-supporting plate 30 is dimensioned to facilitate positioning this plate within a hollow drum designated generally by reference numeral 32. The plate 30 is disposed adjacent a side wall 34 forming a portion of the drum 32 and is separated from this side wall by a suitable friction reducing bearing element or washer 36. Secured to the side wall 34 of the drum 32 at a central portion of this wall is a tubular arm 38 which projects normal to the wall 34 and concentrically surrounds the shaft 22 carried by the contact-mounting plate 30. A tubular brass sleeve 40 is pressed into the tubular arm 38 and provides a bearing between this arm and the tubular shaft 22. The tubular arm 38 which projects from the side wall 34 of the drum 32 bears against a washer 42 which is positioned between the end of this arm and the hub 14 of the mounting arm 10.

Figure 3:
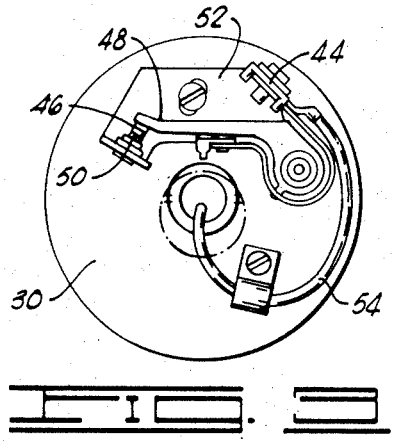
FIG. 3 is a detail view in elevation illustrating one side of the contact-supporting plate and the electrical contacts carried thereon.

The contact-supporting plate 30 carries a contact assembly which includes a terminal post 44 to which one end of an electrical lead is connected (see FIG. 3). The contact assembly then provides an insulated circuit path from the post 44 to a movable contact point 46 carried at one end of a cantilevered spring biased contact arm 48. The contact point 46 is normally resiliently biased into contact with a second contact point 50 which is grounded through a grounding plate 52 to the contact-supporting plate 30. An electrical lead 54 is extended from the terminal post 44 through the bore in the shaft 22 and passes out of this shaft on the other side of the hub 14 as shown in FIG. 1.

Figure 2:
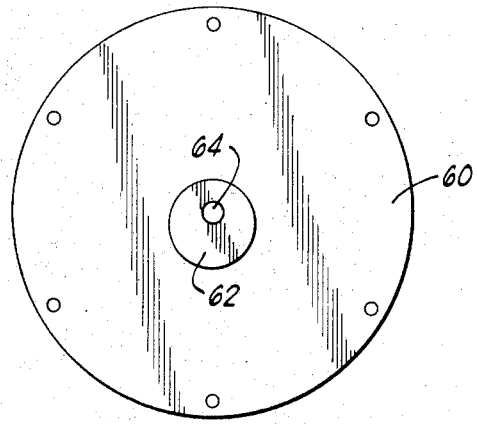
FIG. 2 is a detail view in elevation of a drum closure plate utilized in the precision odometer, and showing the opposite side of the drum closure plate from that side illustrated in FIG. 1.

A drum closure plate 60 is provided for closing the side of the drum opposite the side wall 34. An eccentric disc 62 is secured to the surface of the plate 60 which faces the inside of the drum by any suitable means, such as the threaded bolt 64. The eccentric disc 62 is secured by the bolt 64 in a position such that its outer periphery is eccentric with respect to the center of the closure plate 60 as shown in FIG. 2 of the drawings.

The electrical circuitry forming a portion of the precision odometer of the invention includes the switch formed by the contact points 46 and 50, a counter device 66, an on-off switch 68, an automobile ignition switch 70 and a source of electrical power, such as a battery 72. This circuitry is illustrated in FIG. 6 of the drawings.

Figure 5:
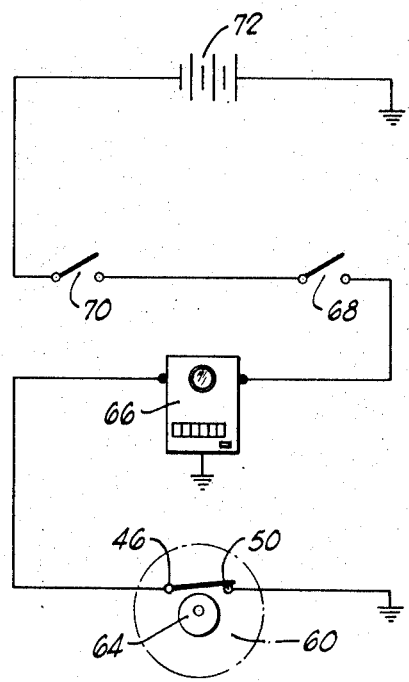
FIG. 5 is a schematic view illustrating the manner in which the mechanical portions of the precision odometer of the invention are mounted on an automobile or other vehicle, and showing in dashed lines, the inoperative position of the odometer. A ground engaging wheel which is contacted by the drum of the odometer during use is shown as a broken line forming a circle.

The manner in which the precision odometer is mounted on an automobile or other vehicle is best illustrated in FIG. 5. In this figure, there is depicted, as a broken line, a ground engaging wheel 74 of a vehicle. The mounting bracket 18 is secured by any suitable type of connection bracket 20 to a structural member on the vehicle in a position such that the mounting arm 10 is suspended therefrom, and maintains the drum 32 in a position to contact the wheel 74 as illustrated in FIG. 5. Connected to the eyelet 28 is a spring 76 which has its other end connected through a cable 78 to a suitable anchor point 80 located on the chassis, or other structural member of the vehicle. It will be perceived from the depicted arrangement that the spring 76 is tensioned to continuously bias the drum 32 of the odometer into frictional contact with the outer periphery of the ground engaging wheel 74. In the case of an automobile, this is the flat peripheral surface of the pneumatic tire which is carried on the wheel.

Figure 4:
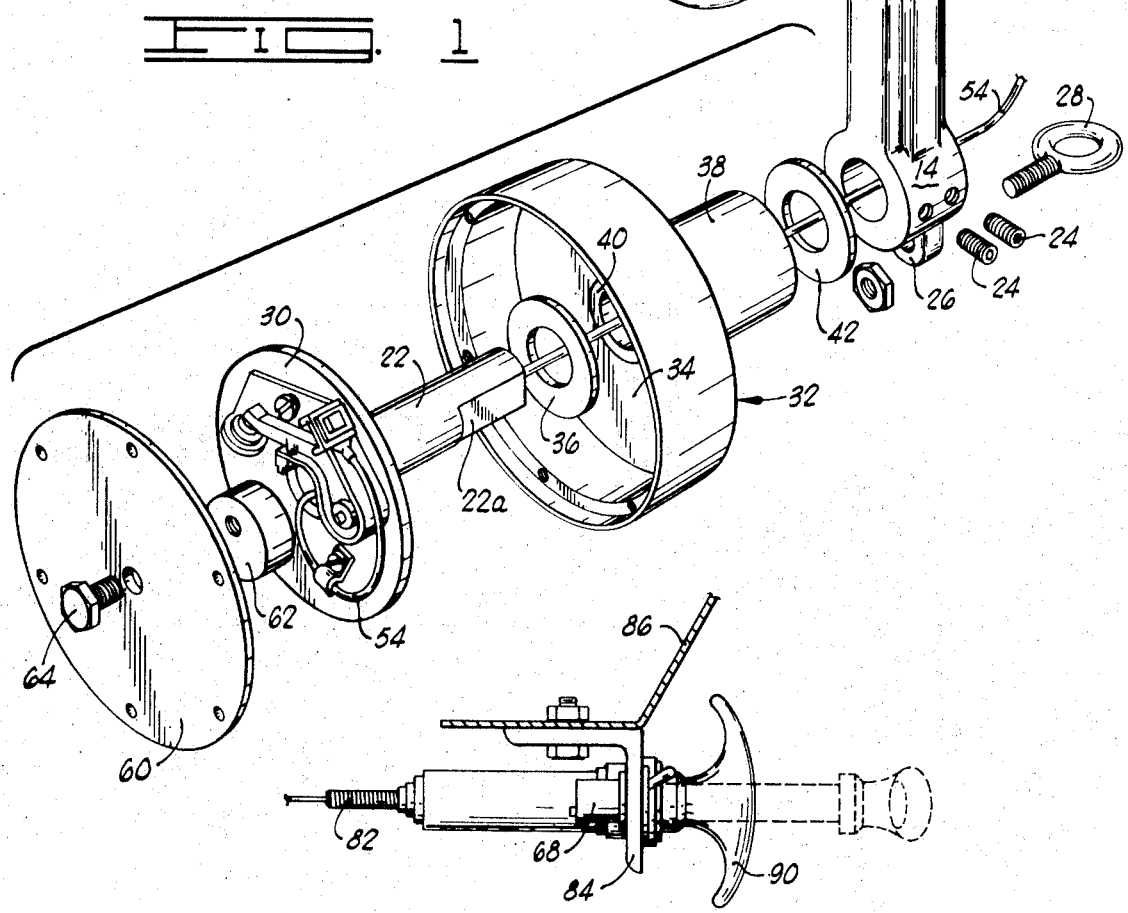
FIG. 4 is a detail view in elevation illustrating a bracket employed to mount a switch and hand pull assembly employed for operating and controlling the use of the precision odometer of the invention.
Figure 3:
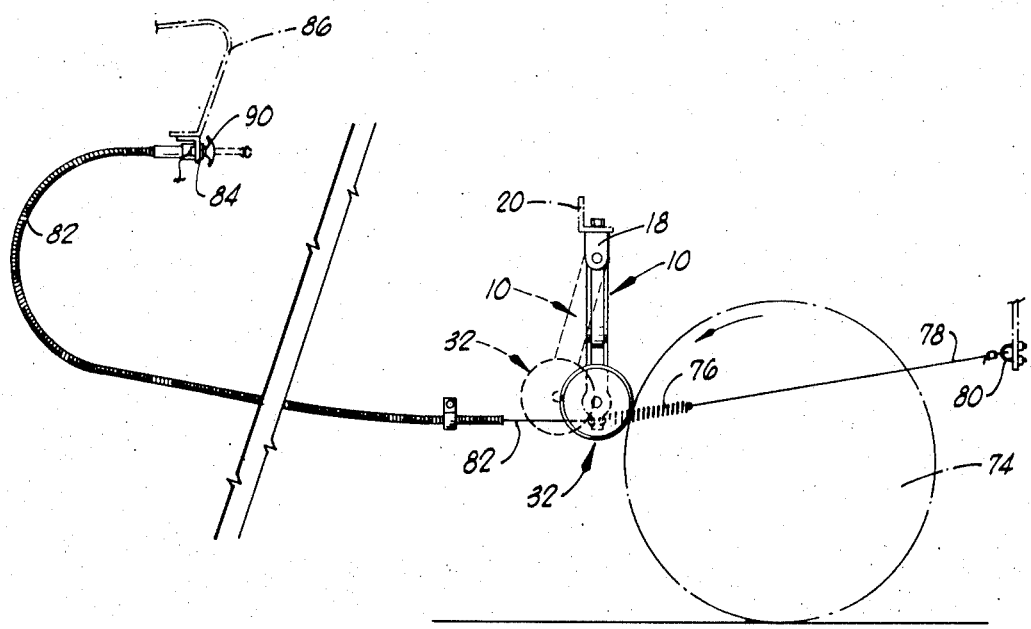

For the purpose of disengaging the drum 32 from contact with the wheel 74, a Bowden cable 82 is connected to the eyelet 28 on the opposite side thereof from the spring 76. The Bowden cable extends to a bracket 84 which is adapted to be bolted to the dashboard 86 of an automobile in the manner best depicted in FIG. 4. The bracket 84 also carries a mounting aperture for the on-off switch 68 forming a portion of the electrical circuit depicted in FIG. 6. A handle 90 is connected to one end of the interior slide wire of the Bowden cable so that this wire may be tensioned by pulling the handle 90, and thereby pivot the mounting arm 10 and the drum 32 carried thereby away from the ground engaging wheel 74. As is well understood in the art, when the handle 90 is pulled outwardly from the bracket 84 to retract the wire of the Bowden cable and pivot the drum 32 to its inoperative position, the handle 90 may then be turned through 90° to the position illustrated in dashed lines in FIG. 4. This locks the Bowden cable in this position, and retains the drum in its retracted, disengaged position with respect to the ground engaging wheel 74.

OPERATION

With the precision odometer mounted on a vehicle having ground engaging wheels in the manner illustrated schematically in FIG. 5, and with the electrical circuitry connected, for example, to a storage battery and through the ignition switch of the vehicle as shown in FIG. 6, the odometer is utilized as follows. When it is desired to measure a distance on the ground, such as for the crop dusting measurement application of the odometer as hereinbefore described, the handle 90 is released so that it may move from the dashed line positions shown in FIGS. 4 and 5 to the full line position shown in these figures. The handle 90 is, of course, easily accessible to the operator of the vehicle in much the same manner as a hand operated safety brake is accessible. This permits the drum 32 to be biased by the spring 76 into contact with the outer periphery of the ground engaging wheel 74. At this time and prior to startup of the vehicle at the starting point from which the measurement is to be made, the on-off switch 68 is closed, and as the vehicle is started, the ignition switch 70 is also closed. As the vehicle moves across the ground, the ground engaging wheel 74 undergoes rotation, with each rotation of this wheel being equivalent to the traverse of a linear distance on the ground corresponding to the circumference of the outer periphery of the wheel. At the same time, through the frictional engagement of the wheel with the drum 32, the drum is caused to undergo rotation. The drum 32 may freely rotate upon the tubular shaft 22, which shaft is fixed due to its rigid connection in the hub 14 of the mounting arm 10.

With each revolution of the drum 32, the eccentric disc 62 is also rotated through one revolution, and in undergoing a single revolution, biases the contact 46 away from the contact 50 to open the electrical circuit. Thus, during each revolution of the drum 32, the circuit is opened and closed one time, and therefore a single count is developed by the cumulative counter 66.

This counter provides a readout which may be expressed in terms of the number of revolutions of the drum 32, feet, rods or any other suitable figure. It is thus possible to tell precisely how far the automobile has traveled in feet or rods, and the measurement thus made is extremely accurate because of the precise correlation between the rotation of the drum 32, and the rotation of the ground engaging wheel 74.

After the measurement has been completed in the manner described, the handle 90 can again be withdrawn in a direction away from the bracket 84 to pivot the drum 32 to its inoperative position.

Although a preferred embodiment of the invention has been herein described in order to illustrate the basic principles which underlie the invention, it will be perceived that various changes and modifications to the described system can be effected without departure from these basic principles. Changes and innovations of this type are therefore deemed to be circumscribed by the spirit and scope of the invention except as the same may be necessarily limited by the appended claims or reasonable equivalents thereof.

What is claimed is:

1. An odometer comprising:
    a hollow drum;
    a tubular arm projecting from one side of said drum;
    a contact-supporting plate mounted in said drum;
    a hollow shaft projecting from one side of said plate through said tubular arm and rotatably supporting said arm and drum thereon;
    a mounting arm secured to the end of said hollow shaft on the opposite side of said shaft from said contact-supporting plate;
    electrical contact points mounted on said contact-supporting plate within said drum and adapted for movement between alternate positions for opening and closing an electrical circuit;
    eccentric means mounted in said drum and rotatable therewith relative to said shaft and contact-supporting plate for periodically moving said contact points from a circuit closing to a circuit opening position;
    electrical circuitry including said contact points, an electrical lead connected to at least one of said contact points and extending through the hollow interior of said hollow shaft, a source of electrical power, and a counter for registering a distance value in correlation to the number of revolutions of said drum and tubular arm about the axis of said shaft; means for movably mounting said mounting arm on a supporting structure; and
    means for manually displacing said mounting arm and drum between an operative position and an inoperative position.

2. An odometer as defined in claim 1 wherein said hollow drum is cylindrical in configuration and said tubular arm projects concentrically along the axis of said cylindrical drum; and
    wherein said eccentric means comprises:
        a closure plate detachably closing one side of said cylinder and extending in a plane projecting normal to the axis of said cylindrical drum; and
        an eccentric disc secured to said closure plate and having an outer periphery configured to periodically move one of said contact points relative to the other.

3. An odometer as defined in claim 1 wherein said mounting arm is an elongated member having a pair of oppositely directed 90° reverse bends therein, and having a hub at one end thereof receiving said hollow shaft.

4. An odometer as defined in claim 1 wherein said means for movably mounting said mounting arm on a supporting structure comprises a mounting bracket pivotally connected to one end of said mounting arm and adapted for securement to said supporting structure.

5. An odometer as defined in claim 1 wherein said means for manually displacing said mounting arm and drum comprises:
    resilient biasing means connected to said mounting arm for resiliently urging said mounting arm to a first position; and
    a pull cable connected to said mounting arm for pulling the mounting arm in a direction opposite the direction toward which it is urged by said resilient biasing means.

6. An odometer as defined in claim 1 and further characterized as including a bearing sleeve positioned between said tubular arm and said hollow shaft.

7. An odometer as defined in claim 1 wherein said electrical circuitry is further characterized as including an on-off switch, and wherein one of said contact points is grounded to said contact-supporting plate.

8. An odometer as defined in claim 7 and further characterized as including
    a bracket adapted for securement to the dashboard of an automobile, said bracket having said on-off switch mounted therein; and
    a pull handle reciprocably mounted in said bracket and forming a part of said means for manually displacing said mounting arm and drum.

9. An odometer as defined in claim 8 wherein said means for manually displacing said mounting arm and drum further comprises:
    resilient biasing means connected to said mounting arm for resiliently urging said mounting arm to a first position; and
    cable means connected between said mounting arm and said pull handle for pulling the mounting arm in a direction opposite the direction toward which it is urged by said resilient biasing means.

10. An odometer as defined in claim 7 wherein said hollow drum is cylindrical in configuration and said tubular arm projects concentrically along the axis of said cylindrical drum; and
    wherein said eccentric means comprises:
        a closure plate detachably closing one side of said cylinder and extending in a plane projecting normal to the axis of said cylindrical drum; and
        an eccentric disc secured to said closure plate and having an outer periphery configured to periodically move one of said contact points relative to the other.

11. An odometer as defined in claim 10 wherein said mounting arm is an elongated member having a pair of oppositely directed 90° reverse bends therein, and having a hub at one end thereof receiving said hollow shaft.

12. An odometer as defined in claim 11 wherein said means for movably mounting said mounting arm on a supporting structure comprises a mounting bracket pivotally connected to the opposite end of said mounting arm from the end thereof at which said hub is located.

13. An odometer as defined in claim 12 wherein said means for manually displacing said mounting arm and drum comprises:

resilient biasing means connected to said mounting arm for resiliently urging said mounting arm to a first position; and a pull cable connected to said mounting arm for pulling the mounting arm in a direction opposite the direction toward which it is urged by said resilient biasing means.

* * * * *